(12) United States Patent
Wakai

(10) Patent No.: US 9,135,407 B2
(45) Date of Patent: Sep. 15, 2015

(54) LICENSE MANAGEMENT APPARATUS, LICENSE MANAGEMENT METHOD, AND STORAGE MEDIUM

(75) Inventor: Kazuo Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 12/178,515

(22) Filed: Jul. 23, 2008

(65) Prior Publication Data

US 2009/0031432 A1   Jan. 29, 2009

(30) Foreign Application Priority Data

Jul. 24, 2007   (JP) ................. 2007-192269

(51) Int. Cl.
| | |
|---|---|
| G06F 21/00 | (2013.01) |
| G06F 15/16 | (2006.01) |
| G06F 7/04 | (2006.01) |
| G06F 21/10 | (2013.01) |
| G06F 21/12 | (2013.01) |

(52) U.S. Cl.
CPC .............. G06F 21/10 (2013.01); *G06F 21/121* (2013.01)

(58) Field of Classification Search
USPC .......................................... 705/1–45, 50–79
See application file for complete search history.

(56) References Cited

U.S. PATENT DOCUMENTS

| | | | | |
|---|---|---|---|---|
| 2003/0140009 | A1* | 7/2003 | Namba et al. ................... | 705/59 |
| 2003/0191961 | A1 | 10/2003 | Zunke | |
| 2005/0262573 | A1* | 11/2005 | Bo et al. ......................... | 726/27 |
| 2006/0041512 | A1* | 2/2006 | Stefik .............................. | 705/57 |
| 2006/0085350 | A1* | 4/2006 | Samayamantry et al. ...... | 705/59 |
| 2007/0006324 | A1* | 1/2007 | Osada et al. .................... | 726/27 |
| 2007/0162398 | A1* | 7/2007 | Tadayon et al. ................ | 705/54 |
| 2007/0288386 | A1* | 12/2007 | Adachi et al. .................. | 705/58 |
| 2008/0276321 | A1* | 11/2008 | Svancarek et al. ............. | 726/26 |
| 2008/0281942 | A1* | 11/2008 | Nakahara et al. ............. | 709/218 |

FOREIGN PATENT DOCUMENTS

| | | |
|---|---|---|
| EP | 1528454 A2 | 5/2005 |
| JP | 2005-327196 | 11/2005 |
| JP | 2005-327196 A | 11/2005 |
| JP | 2006-107468 A | 4/2006 |
| JP | 2009-505307 A | 2/2009 |
| KR | 10-2007-0075048 A | 7/2007 |
| WO | 2006-028279 A1 | 3/2006 |
| WO | 2007/024450 A2 | 3/2007 |

* cited by examiner

*Primary Examiner* — Kimberly Berona
*Assistant Examiner* — Murali K Dega
(74) *Attorney, Agent, or Firm* — Canon USA Inc. IP Division

(57) ABSTRACT

A license management apparatus transfers license information from a transfer source device to a transfer destination device. The license information is required for enabling functions of a program package serving as an integrated product including a plurality of functions. The license management apparatus includes a management unit and a transfer unit. The management unit manages all or part of the plurality of functions as belonging to one group. After license information of functions included in the program package and managed by the management unit as belonging to the same group is acquired from the transfer source device, the transfer unit transfers license information of functions managed as belonging to the same group to the transfer destination device.

5 Claims, 19 Drawing Sheets

FIG.3

301 LA ISSUANCE MANAGEMENT TABLE

| PRODUCT ID | LA | LICENSE CONDITION (NUMBER OF LICENSES) |
|---|---|---|
| id_Integrate_A | 123456 | 1 |
| id_Integrate_B | 123457 | 2 |
| id_OptionAXX | FFF001 | 1 |

FIG.4

401 LICENSE ISSUANCE MANAGEMENT TABLE

| LA | DEVICE-SPECIFIC INFORMATION (DS) | ISSUED LICENSE |
|---|---|---|
| 123456 | A00000 | |
| FFF001 | C00000 | |

FIG.5

501 PRODUCT MANAGEMENT TABLE

| NAME OF PRODUCT | PRODUCT ID | NAME OF FUNCTION | FUNCTION ID |
|---|---|---|---|
| OptionAXX | id_OptionAXX | OptionA | id_OptionA |
| OptionBXX | id_OptionBXX | OptionB | id_OptionB |
| OptionCXX | id_OptionCXX | OptionC | id_OptionC |
| AfterAddOptionDXX | id_AddOptionDXX | OptionD | id_AddOptionD |
| AfterAddOptionEXX | id_AddOptionEXX | OptionE | id_AddOptionE |

FIG.6

601 INTEGRATED PRODUCT MANAGEMENT TABLE

| NAME OF PRODUCT | PRODUCT ID | GROUP INFORMATION (GROUP IDENTIFICATION ID) | FUNCTION ID |
|---|---|---|---|
| INTEGRATED PRODUCT A | id_Integrate_A | α | id_OptionA |
| | | | id_OptionB |
| | | | id_OptionC |
| | | | id_AddOptionD |
| | | | id_AddOptionE |
| INTEGRATED PRODUCT B | id_Integrate_B | β | id_OptionA |
| | | | id_AddOptionD |
| | | γ | id_OptionB |
| | | | id_OptionC |
| | | | id_AddOptionE |

FIG.7

701 MACHINE MODEL MANAGEMENT TABLE

| MACHINE MODEL | DEVICE-SPECIFIC INFORMATION (DS) |
|---|---|
| X | A00000-AFFFFF |
| Y | B00000-BFFFFF |
| Z | C00000-CFFFFF |

FIG.8

801 SUPPORT INFORMATION MANAGEMENT TABLE

| FUNCTION ID | MACHINE MODEL X | MACHINE MODEL Y | MACHINE MODEL Z |
|---|---|---|---|
| id_OptionA | ○ | ○ | ○ |
| id_OptionB | × | ○ | ○ |
| id_OptionC | ○ | × | ○ |
| id_AddOptionD | ○ | ○ | ○ |
| id_AddOptionE | ○ | ○ | ○ |

FIG.18

INTEGRATED PRODUCT | ⌂ TO PORTAL MENU | LOGOUT

*LICENSE BATCH TRANSFER*

1800

DEVICE SERIAL No. OF TRANSFER SOURCE * | A00000
DEVICE SERIAL No. OF TRANSFER DESTINATION * | B00000
DEVICE SERIAL No. OF TRANSFER DESTINATION CONFIRMATION ENTRY * | B00000

NEXT ⇧

⇦ TO CATEGORY MENU | ⇐ BACK

| INTEGRATED PRODUCT | | ⌂ TO PORTAL MENU | LOGOUT |

LICENSE BATCH TRANSFER > TRANSFER | LICENSE DESIGNATION

| TRANSFER SOURCE DEVICE INFORMATION | | TRANSFER DESTINATION DEVICE INFORMATION | |
|---|---|---|---|
| DEVICE SERIAL No. | A00000 | DEVICE SERIAL No. | B00000 |

TRANSFER LICENSE FILE

| forward_optinA_lic | BROWSE... |
|---|---|
| forward_optinB_lic | BROWSE... |
| forward_optinC_lic | BROWSE... |
| forward_AddoptinD_lic | BROWSE... |
| forward_AddoptinE_lic | BROWSE... |

ADD NUMBER OF FILES

NEXT ⇒

⌂ TO CATEGORY MENU    ⇐ BACK

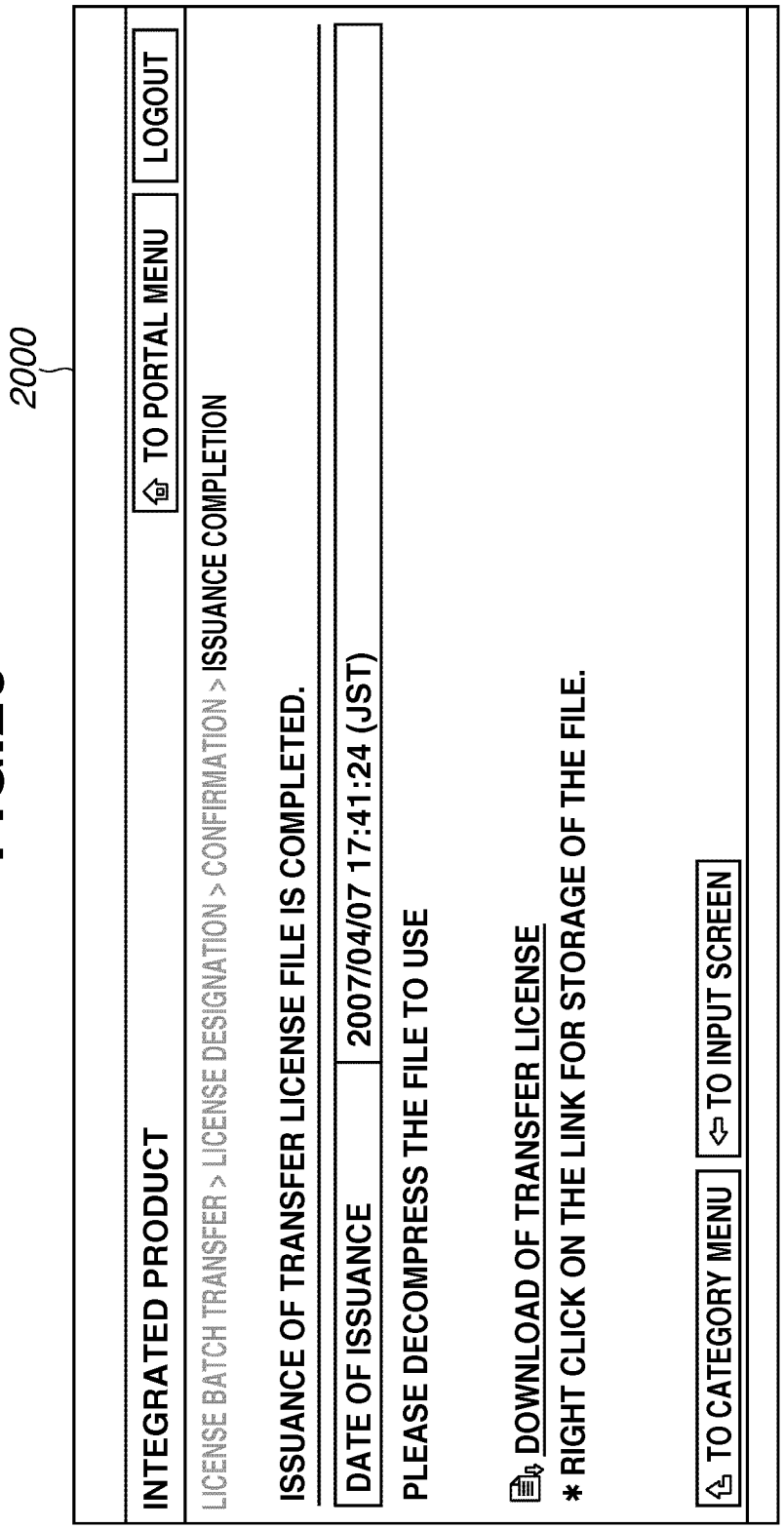

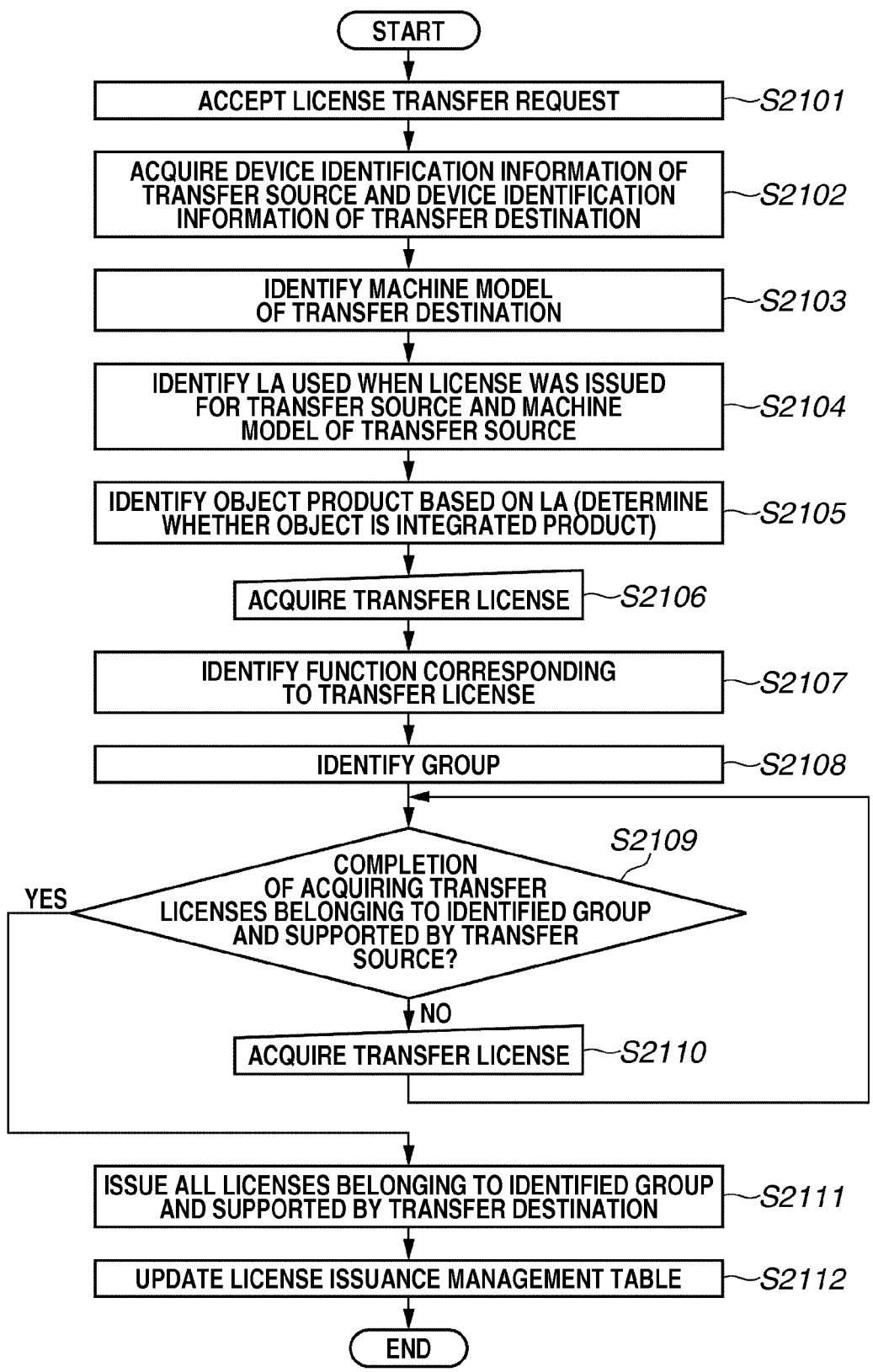

LICENSE MANAGEMENT APPARATUS, LICENSE MANAGEMENT METHOD, AND STORAGE MEDIUM

BACKGROUND OF THE INVENTION

1. Field of the Invention

The present invention relates to a license management apparatus, a license management method, and a storage medium.

2. Description of the Related Art

A device can incorporate optional functions beforehand, or optional functions can be later installed on a device. In such cases, a user of the device is allowed to use an optional function only when a license corresponding to the function is installed on the device. In other words, a user is not allowed to use the same function on another device unless the license issued for the use of this function is removed from the former device. Thus, a user transfers the license of an intended function, for example, from an old device to a new device.

As discussed in Japanese Patent Application Laid-Open No. 2006-107468, a license transfer system allows removing a license from a transfer source device while disabling the license given to the transfer source device. The system enables transferring a license between two devices while preventing unauthorized use of the license.

A multifunction peripheral (MFP) is a device that can perform various functions based on licenses. Therefore, considering the usability for users, it is desired to provide and manage a program package for each MFP as one product that integrates a plurality of functions. In general, volume discount is applied a program package. More specifically, a program package can be obtained at a low price compared to a total price required for respective functions that are separately provided.

However, if license transfer processing is performed according to the above-described conventional system, licenses corresponding to respective functions included in the same program package are separately transferred. Therefore, respective functions of a program package, which are provided for the limited use in an authorized device, may be divided and used in different devices.

SUMMARY OF THE INVENTION

According to an aspect of the present invention, a license management apparatus is configured to transfer license information from a transfer source device to a transfer destination device. The license information is required for enabling functions of a program package serving as an integrated product including a plurality of functions. The apparatus includes a management unit configured to manage all or part of the plurality of functions as belonging to one group, and a transfer unit configured to transfer, after license information of functions included in the program package and managed by the management unit as belonging to the same group is acquired from the transfer source device, license information of functions managed as belonging to the same group to the transfer destination device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 3 illustrates an example license access number (LA) issuance management table according to the first exemplary embodiment of the present invention.

FIG. 4 illustrates an example license issuance management table according to the first exemplary embodiment of the present invention.

FIG. 5 illustrates an example product management table that manages product information other than integrated product information according to the first exemplary embodiment of the present invention.

FIG. 6 illustrates an example integrated product management table that manages product information of integrated products according to the first exemplary embodiment of the present invention.

FIG. 7 illustrates an example machine model management table according to the first exemplary embodiment of the present invention.

FIG. 8 illustrates an example support information management table according to the first exemplary embodiment of the present invention.

FIG. 18 illustrates an example device identification information input screen according to the first exemplary embodiment of the present invention.

FIG. 19 illustrates an example transfer license designation screen according to the first exemplary embodiment of the present invention.

FIG. 20 illustrates an example license acquisition screen according to the first exemplary embodiment of the present invention.

FIG. 21 is a flowchart illustrating an example operation of the license management server performed during license transfer processing according to a second exemplary embodiment of the present invention.

DETAILED DESCRIPTION OF THE EMBODIMENTS

Figure 1:
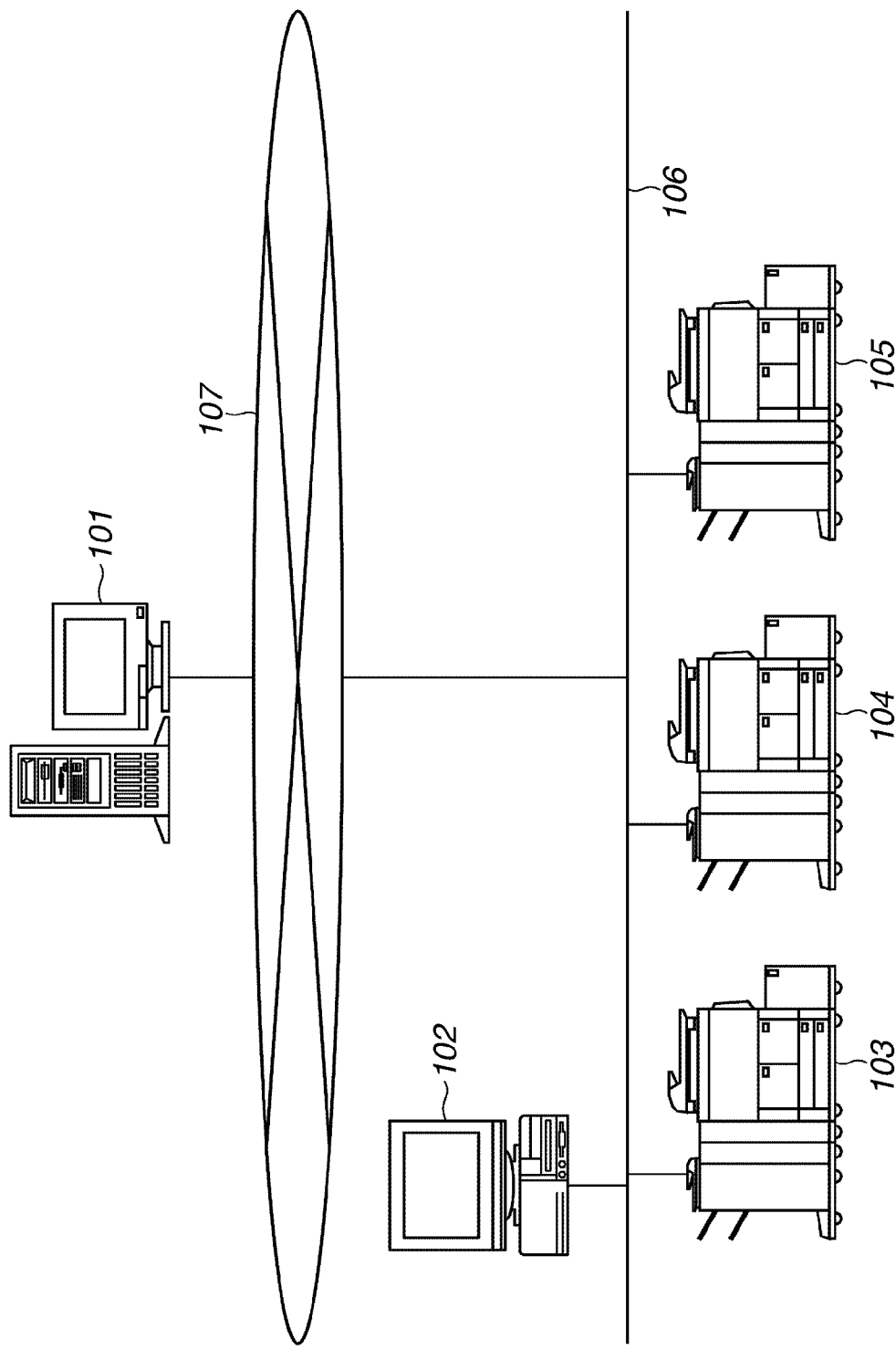
FIG. 1 illustrates an example network system according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates an example network system that operates as a device management system according to a first exemplary embodiment of the present invention. A plurality of multifunction peripherals (MFPs) 103 through 105 can communicate with other devices via a network. The MFPs 103 through 105 can install licenses for the use of functions (optional functions) incorporated beforehand in the devices or functions later installed. Furthermore, the MFPs 103 through 105 can disable the functions corresponding to licenses when the licenses are uninstalled.

A personal computer (PC) 102 can communicate with respective MFPs 103 through 105 via a local area network (LAN) 106. The PC 102 can install licenses for the MFPs 103 through 105. The PC 102 and the MFPs 103 through 105 are accessible to the Internet 107 via the LAN 106. A license management server 101 can communicate with the PC 102 and the MFPs 103 through 105 via the Internet 107.

The license management server 101 performs license management processing, which includes issuance of license information required to enable functions of the MFPs 103 through 105 and license transfer processing for enabling another MFP to use installed license information. The license transfer processing according to an exemplary embodiment is for enabling another MFP to use functions corresponding to transfer license information removed and returned from any of the MFPs 103 through 105.

Furthermore, the license management server 101 manages a product including functions that can be enabled based on license information and performs registration/management for the configuration of the product. In particular, the license management server 101 manages a program package including a plurality of integrated functions registered as belonging to one group. Then, the license management server 101 manages functions and license information for each registered group.

In the following description, the license information may be simply referred to as "license." In an exemplary embodiment, a program package including a plurality of functions is referred to as "integrated product." The integrated product is an example program package including a plurality of functions integrated as a product.

The license management server 101 issues a license to the PC 102 when the license management server 101 receives device-specific information DS and LA required for issuance of the license from the PC 102.

In particular, when the license management server 101 receives a single LA allocated to an integrated product from the PC 102, the license management server 101 issues licenses for all functions included in the integrated product corresponding to the received LA. The type of the issued license is, for example, a license file or a license key. The license management server 101 issues a license file when a license to be provided is a file. The license management server 101 issues a license key when a license to be provided is an ID number that can identify the license.

Figure 2:
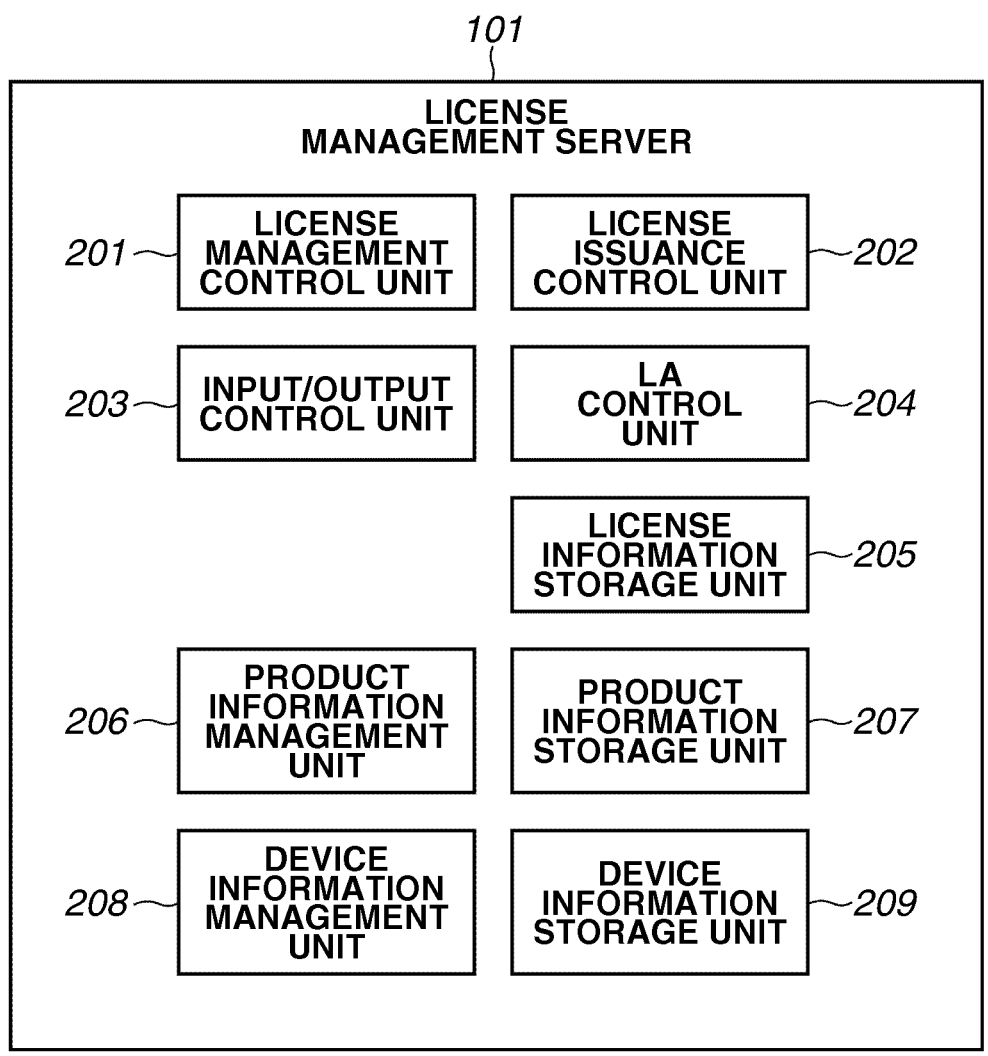
FIG. 2 is a block diagram illustrating an example module configuration of a license management server according to the first exemplary embodiment of the present invention.

FIG. 2 is a block diagram illustrating an example module configuration of the license management server 101 illustrated in FIG. 1.

In FIG. 2, a license management control unit 201 performs various control operations for the license management server 101. A license issuance control unit 202 performs various control operations relating to issuance/generation of a license in response to a request from the PC 102. An input/output control unit 203 performs control/management for "input/output of license and data" when information relating to issuance of a license is input from or output to an external device. An LA control unit 204 performs issuance/management of a license access number (LA). A license information storage unit 205 stores device-specific information DS required for issuance/management of a license, LA, issued license, license condition, and product ID.

FIG. 3 illustrates an example LA issuance management table 301 stored in the license information storage unit 205. The LA issuance management table 301 stores (manages) identification information (product ID), issued LA, and license condition for each license object product. FIG. 4 illustrates an example license issuance management table 401 stored in the license information storage unit 205. The license issuance management table 401 stores (manages) LA, device-specific information DS of each license issuance object device, and issued license in association with one another.

A product information management unit 206 performs registration/management for a function ID that can identify information (e.g., name of product, product ID, name of function, and function) relating to a function that requires a license when used. Furthermore, the product information management unit 206 performs registration/management of information relating to an integrated product, e.g., name of product, product ID, name of function, identification information of a group to which a plurality of functions included in the integrated product belong, and functions included in each group.

A product information storage unit 207 stores the above-described information (product information) registered and managed by the product information management unit 206. FIG. 5 illustrates an example product management table 501 that manages product information other than integrated product information. The product information storage unit 207 stores the product management table 501 illustrated in FIG. 5. The product management table 501 stores (manages) product information (e.g., name of product, product ID, name of function, and function ID). In this manner, the product management table 501 can manage product information for respective functions.

FIG. 6 illustrates an example integrated product management table 601 that manages product information of integrated products. The product information storage unit 207 stores the integrated product management table 601. The integrated product management table 601 stores (manages) product information (e.g., name of product, product ID, group information (group identification ID), and function ID). The integrated product management table 601 is a management table that stores product information including a configuration of each integrated product stored in the product information storage unit 207.

A device information management unit 208 manages device-related information, such as mapping information between device-specific information DS and machine model (i.e., information identifying a machine model of each device (MFPs 103 through 105)) as well as "license requiring function" supported by each machine model.

FIG. 7 illustrates an example machine model management table 701 that manages mapping information including device-specific information DS and machine model. The device information storage unit 209 stores the machine model management table 701. The machine model management table 701 stores (manages) information relating to machine model and device-specific information DS managed by the device information management unit 208.

FIG. 8 illustrates an example support information management table 801 that manages the "license requiring function" supported by each machine model. The device information storage unit 209 stores the support information management table 801. In the support information management table 801, "o" indicates a machine model that supports a function identified by a function ID and "x" indicates a machine model that does not support a function identified by a function ID.

Figure 9:
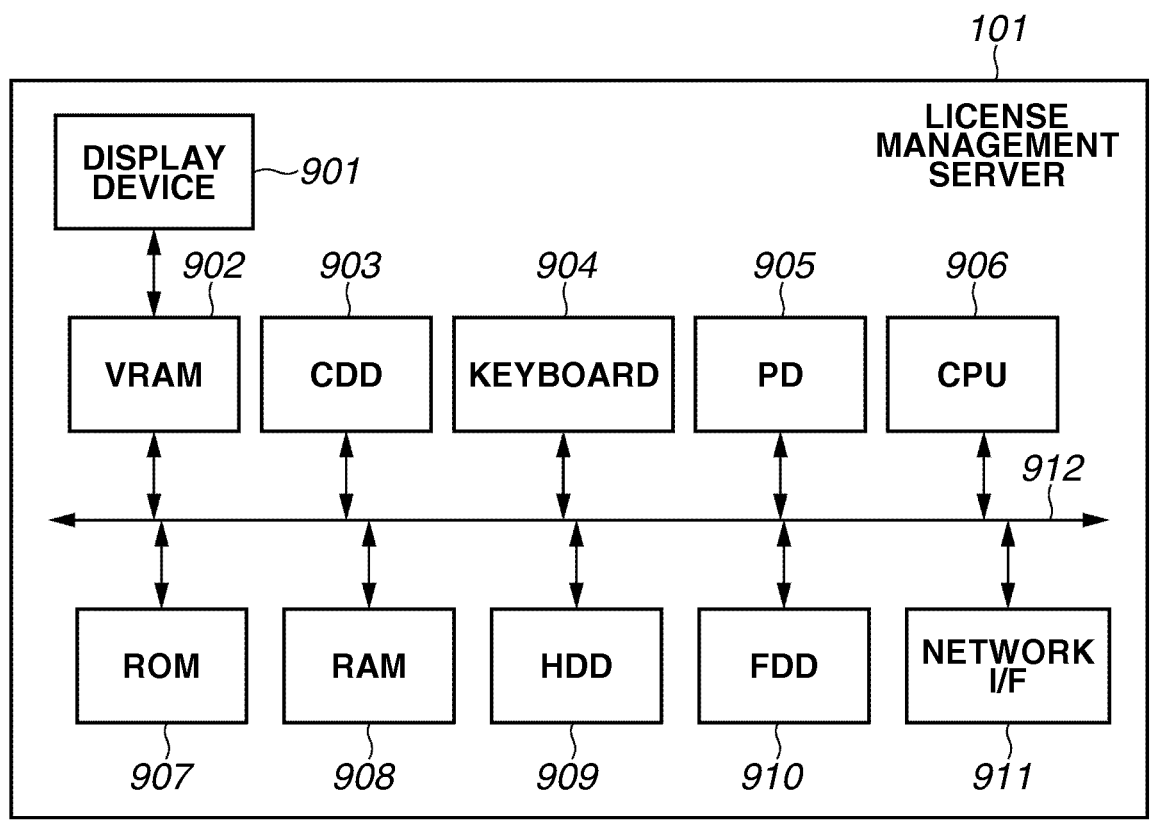
FIG. 9 is a block diagram illustrating an example hardware configuration of a license management server according to the first exemplary embodiment of the present invention.

FIG. 9 is a block diagram illustrating an example hardware configuration of the license management server 101. In FIG. 9, a display device 901 displays user interface information (e.g., window, icon, message, menu, etc.) on its display screen. A video random access memory (VRAM) 902 renders (generates) image data to be transferred to the display device 901 according to a predetermined protocol. The display device 901 displays an image based on image data rendered (generated) by the VRAM 902.

A compact disc drive (CDD) 903 is an apparatus that can perform reading/writing of various control programs and data from/to various recording media including a compact disc read-only memory (CD-ROM) and a compact disc recordable (CD-R). The CDD 903 can be replaced with a digital versatile disc (DVD) drive.

A keyboard 904 includes various operation keys that enable a user to enter letters and numerical values. A pointing device (PD) 905 is, for example, a mouse that enables a user to indicate an icon, a menu, or another object displayed on the display screen of the display device 901. A central processing unit (CPU) 906 controls devices connected to the CPU 906 based on control programs stored in a read-only memory (ROM) 907, a hard disk drive (HDD) 909, and a floppy disk drive (FDD) 910. The ROM 907 stores various control programs and data. A random access memory (RAM) 908 includes a work area that the CPU 906 can use, a save area for storing data in the event of error processing, and a loading area to which the control programs are loaded.

The HDD 909, functioning as an external storage apparatus, stores various control programs and various data. A network interface (network I/F) 911 performs communications between the license management server 101 and another information processing apparatus (e.g., PC 102) or the MFPs 103 through 105 via the Internet 107. A CPU bus 912 includes an address bus, a data bus, and a control bus. The CPU 906 can receive control programs provided from the ROM 907, HDD 909, FDD 910, and CDD 903. The PC 102 has a hardware configuration similar to that illustrated in FIG. 9.

Figure 10:
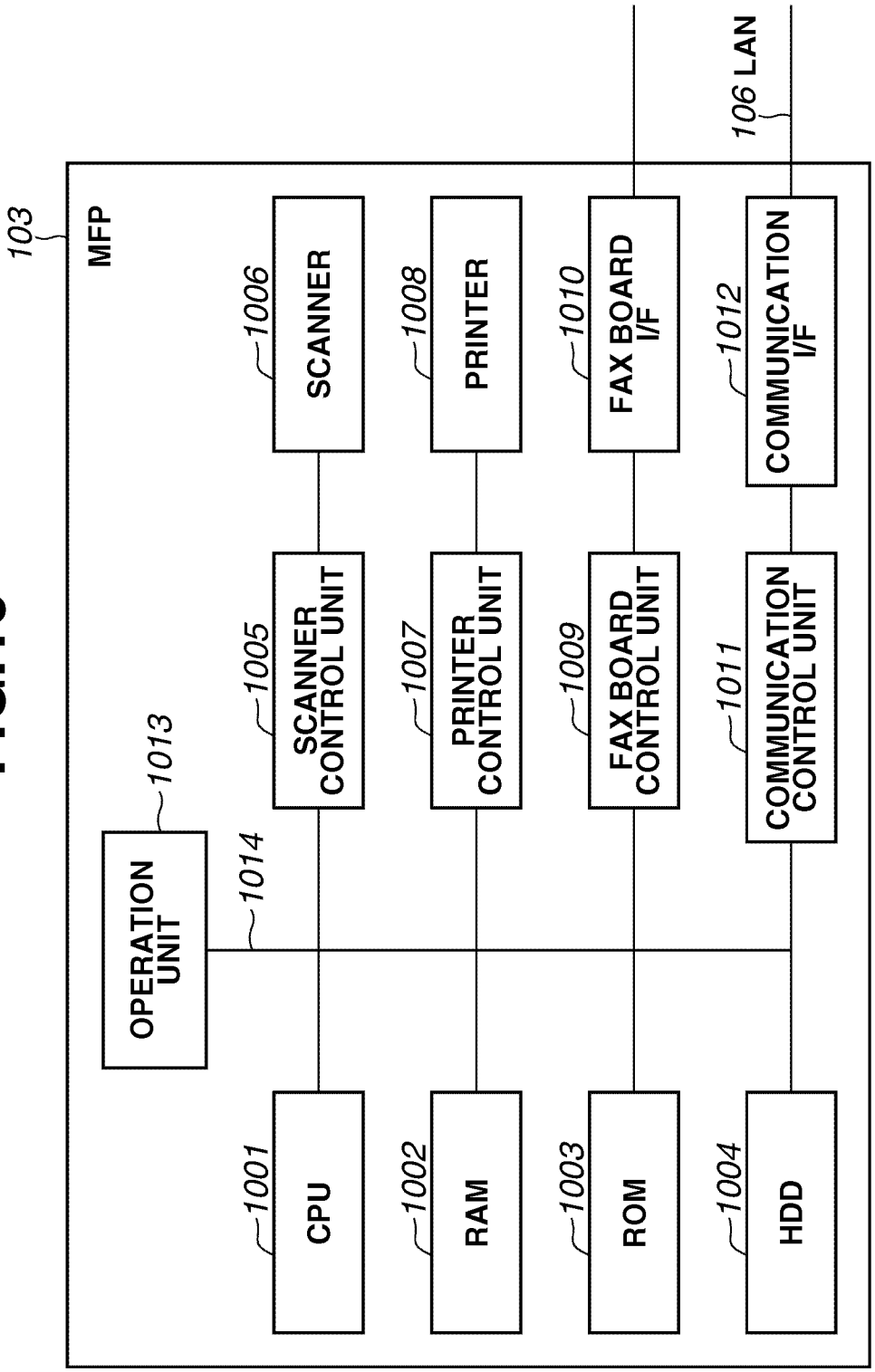
FIG. 10 is a block diagram illustrating an example hardware configuration of a multifunction peripheral (MFP) according to the first exemplary embodiment of the present invention.

FIG. 10 is a block diagram illustrating an example hardware configuration of the MFP 103, although a similar configuration can be applied to other MFPs 104 and 105. In FIG. 10, the MFP 103 includes a central processing unit (CPU) 1001, a random access memory (RAM) 1002, a read-only memory (ROM) 1003, a hard disk drive (HDD) 1004, and an operation unit 1013. Furthermore, the MFP 103 includes a communication control unit 1011, a scanner control unit 1005, a printer control unit 1007, and a FAX board control unit 1009. Furthermore, the MFP 103 includes a scanner unit 1006, a printer 1008, a FAX board I/F 1010, and a communication unit I/F 1012. The functional units of the MFP 103 illustrated in FIG. 10 are mutually connected via a system bus 1014.

The CPU 1001 executes a program loaded into the RAM 1002, e.g., a program stored in ROM 1003 or a control program stored in the HDD 1004, and executes various control operations based on the loaded program. The operation unit 1013 includes a display unit and operates as a user interface. The communication control unit 1011 controls the communication unit I/F 1012, which performs communications, via the LAN 106 and the Internet 107, with another information processing apparatus (e.g., PC 102) or the license management server 101.

The scanner control unit 1005 controls the scanner 1006, which performs reading processing. The printer control unit 1007 controls the printer 1008, which performs print processing. The FAX board control unit 1009 controls the FAX board I/F 1010, which performs ordinary FAX transmission/reception processing. If desired, the MFP 103 can exclude the scanner control unit 1005 and the scanner 1006 or exclude the FAX board control unit 1009 and the FAX board I/F 1010.

Figure 11:
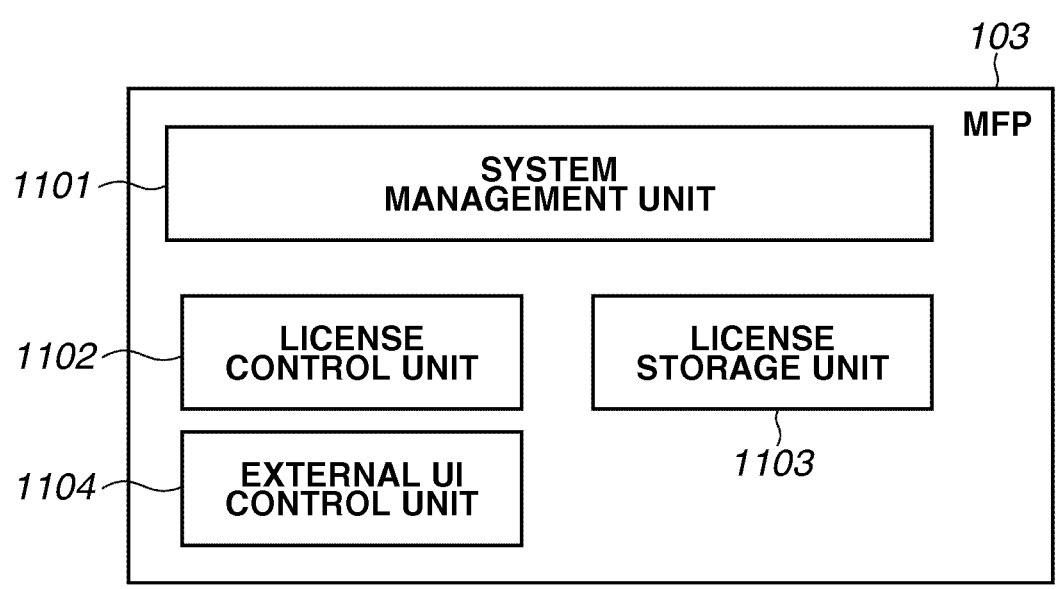
FIG. 11 is a block diagram illustrating an example module configuration of the MFP according to the first exemplary embodiment of the present invention.

FIG. 11 is a block diagram illustrating an example module configuration of the MFP 103. FIG. 11 illustrates a main module configuration of the MFP 103, which performs various operations according to an exemplary embodiment. Other MFPs 104 and 105 have a module configuration similar to that of the MFP 103.

In FIG. 11, a system management unit 1101 controls various functions supported by a device and various processing performed by the device. A license control unit 1102 performs license control processing and management relating to install/uninstall of licenses, enabling/disabling of functions based on licenses, and generation of transfer licenses. A license storage unit 1103 is configured to store installed licenses and related information. An external UI control unit 1104 performs control processing/management relating to "access using a browsing function via UI" from another information processing apparatus (e.g., PC 102) via the LAN 106 and the Internet 107.

Next, an example operation performed by the above-described network system is described below. The license management server 101 performs registration of products other than integrated products for respective functions under the control of the product information management unit 206. The product information management unit 206 stores, into the product management table 501 illustrated in FIG. 5, product information relating to products other than integrated products. As described above, the product management table 501 is stored in the product information storage unit 207. An exemplary embodiment registers five functions illustrated in FIG. 5 as independent products.

Next, the license management server 101 performs registration of integrated products under the control of the product information management unit 206. More specifically, the product information management unit 206 stores, into the integrated product management table 601 illustrated in FIG. 6, product information relating to integrated products. As described above, the integrated product management table 601 is also stored in the product information storage unit 207. An exemplary embodiment registers two products (integrated products A and B) illustrated in FIG. 6. In this case, the integrated product A is an integrated product that includes five functions (i.e., all functions included in the integrated product A) set as a group. The integrated product B is an integrated product that includes five functions classified into two groups.

An exemplary embodiment issues a license for the integrated product A and transfers the issued license. As described above, the product information management unit 206 manages the integrated product management table 601 stored in the product information storage unit 207. In other words, the product information management unit 206 manages all of the five functions included in the integrated product A as belonging to one group. Furthermore, the product information management unit 206 manages part (two) of the five functions included in the integrated product B as belonging to one group and manages the rest (three) as another group. As described above, an exemplary embodiment can realize a management unit configured to use the integrated product management table 601.

The license management control unit 201 of the license management server 101 issues LA for the integrated product A. The issued LA has license condition (number of licenses) of "1." The license information storage unit 205 stores the issued LA in the LA issuance management table 301. The PC 102 obtains LA of the integrated product A, independently. The license management server 101 accepts a license issuance request of the integrated product A from the PC 102 under the control of the license management control unit 201 and the input/output control unit 203. The license issuance request includes device-specific information DS (A00000) of the MFP 103 and LA (123456).

The license management server 101 generates five licenses corresponding to the received LA (123456), which are usable only in the MFP 103, under the control of the LA control unit 204 and the license issuance control unit 202. The generated licenses are licenses for all of the five functions included in the integrated product A. Then, the license management server 101 transmits all of the generated five licenses to the PC 102 (i.e., source of the request) under the control of the input/output control unit 203. The PC 102 installs the acquired licenses on the MFP 103. Thus, the functions of the integrated product A can be enabled when installed on the MFP 103.

Figure 12:
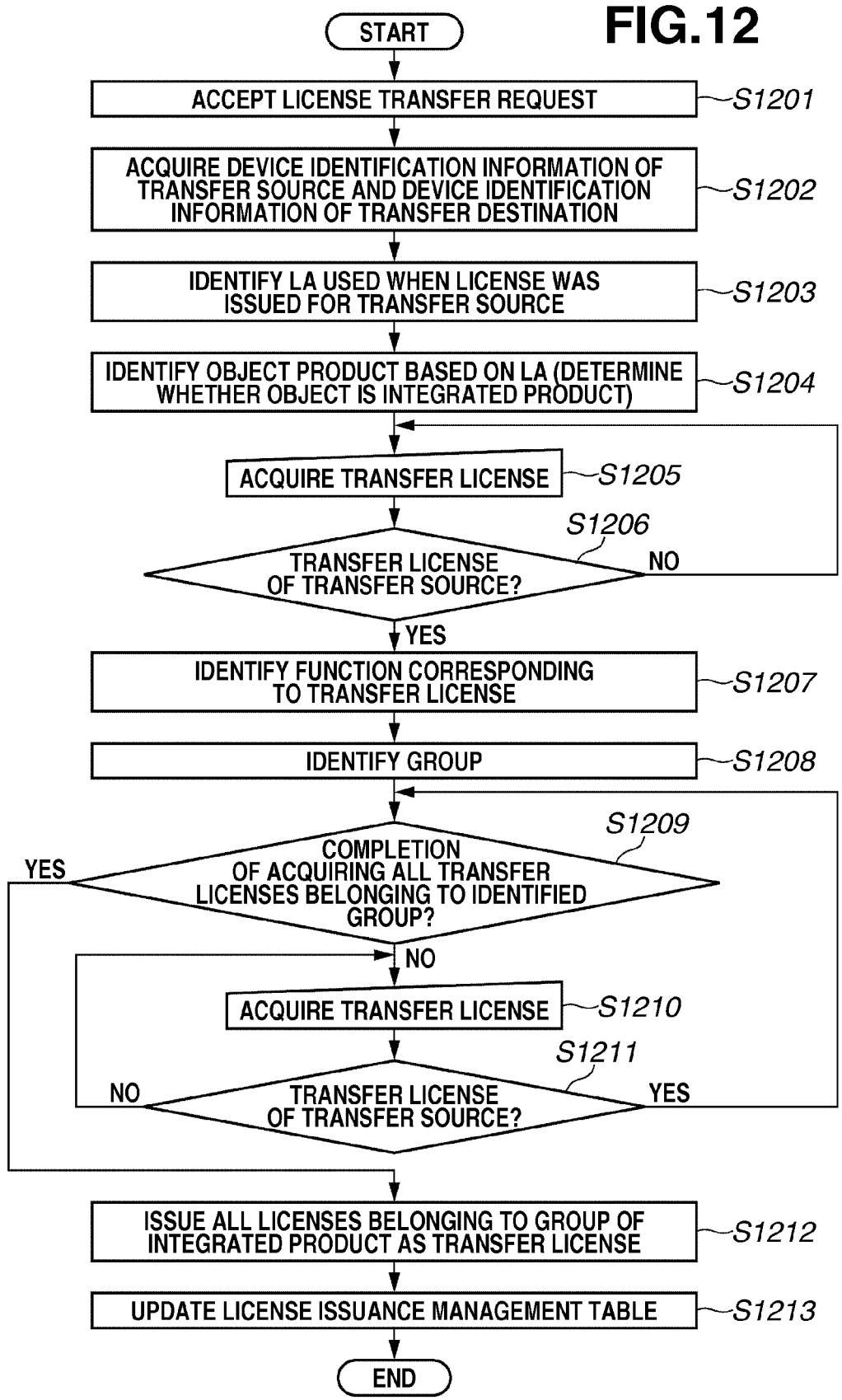
FIG. 12 is a flowchart illustrating an example operation of the license management server performed during license transfer processing according to the first exemplary embodiment of the present invention.
Figure 13:
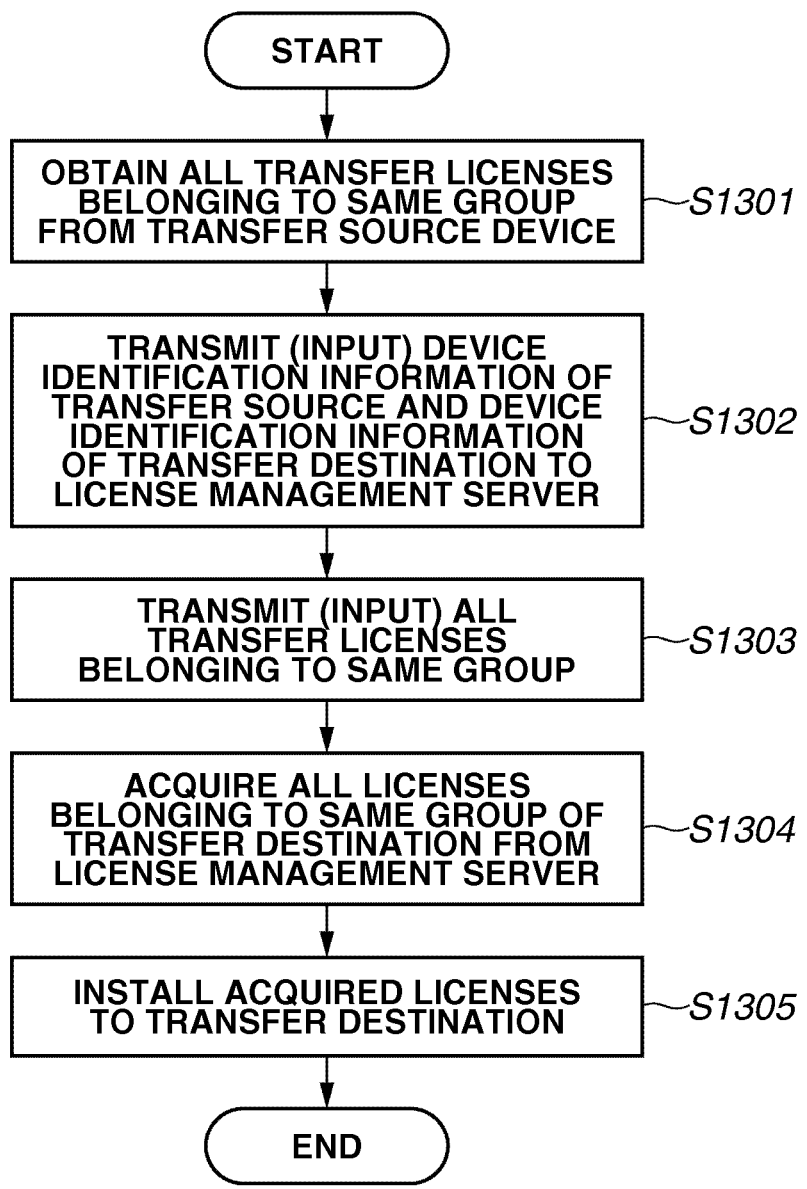
FIG. 13 is a flowchart illustrating an example operation of a personal computer (PC) performed during license transfer processing according to the first exemplary embodiment of the present invention.

Example processing for transferring licenses for the integrated product A from the MFP 103 to the MFP 104 is described below with reference to the flowcharts illustrated in FIGS. 12 and 13. The MFP 103 has device-specific information DS of A00000. The MFP 104 has device-specific information DS of B00000. FIG. 12 is a flowchart illustrating an example operation of the license management server 101, which performs license transfer processing according to an exemplary embodiment. FIG. 13 is a flowchart illustrating an example operation of the PC 102, which performs license transfer processing according to an exemplary embodiment.

Figure 14:
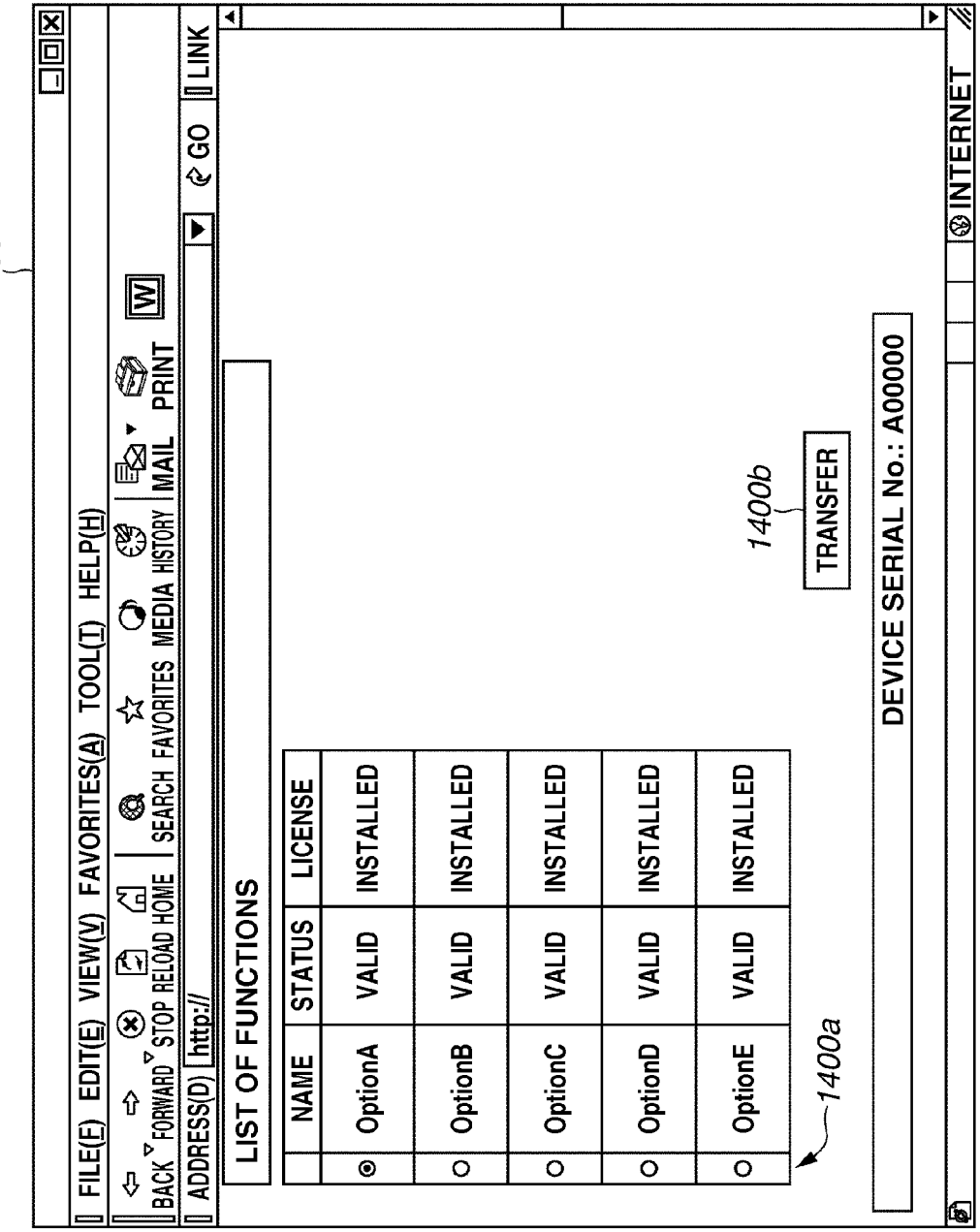
FIG. 14 illustrates an example function list screen according to the first exemplary embodiment of the present invention.

In step S1301, the PC 102 receives transfer licenses corresponding to all functions that are set as belonging to the same group of the integrated product A from the MFP 103. More specifically, in response to a transfer license output request from the PC 102 that can access using a browser, the MFP 103 disables licenses of designated functions under the control of the license control unit 1102 and generates transfer licenses corresponding to the disabled licenses. In an exemplary embodiment, the PC 102 accesses the MFP 103 via a browser and enables a user to select transfer licenses from a function list screen that displays a list of functions installed on the MFP 103. FIG. 14 illustrates an example function list screen 1400.

Next, if a user of the PC 102 selects a radio button 1400a of the license to be transferred and presses a transfer button 1400b on the function list screen 1400 illustrated in FIG. 14, a browser installed on the PC 102 enables the user to access the MFP 103. Then, the PC 102 enables the user to instruct generation/downloading of a transfer file on a transfer license file management screen 1500 illustrated in FIGS. 15 and 16. In response to a user's instruction, the MFP 103 performs generation and downloading of a transfer license under the control of the license control unit 1102.

Figure 15:
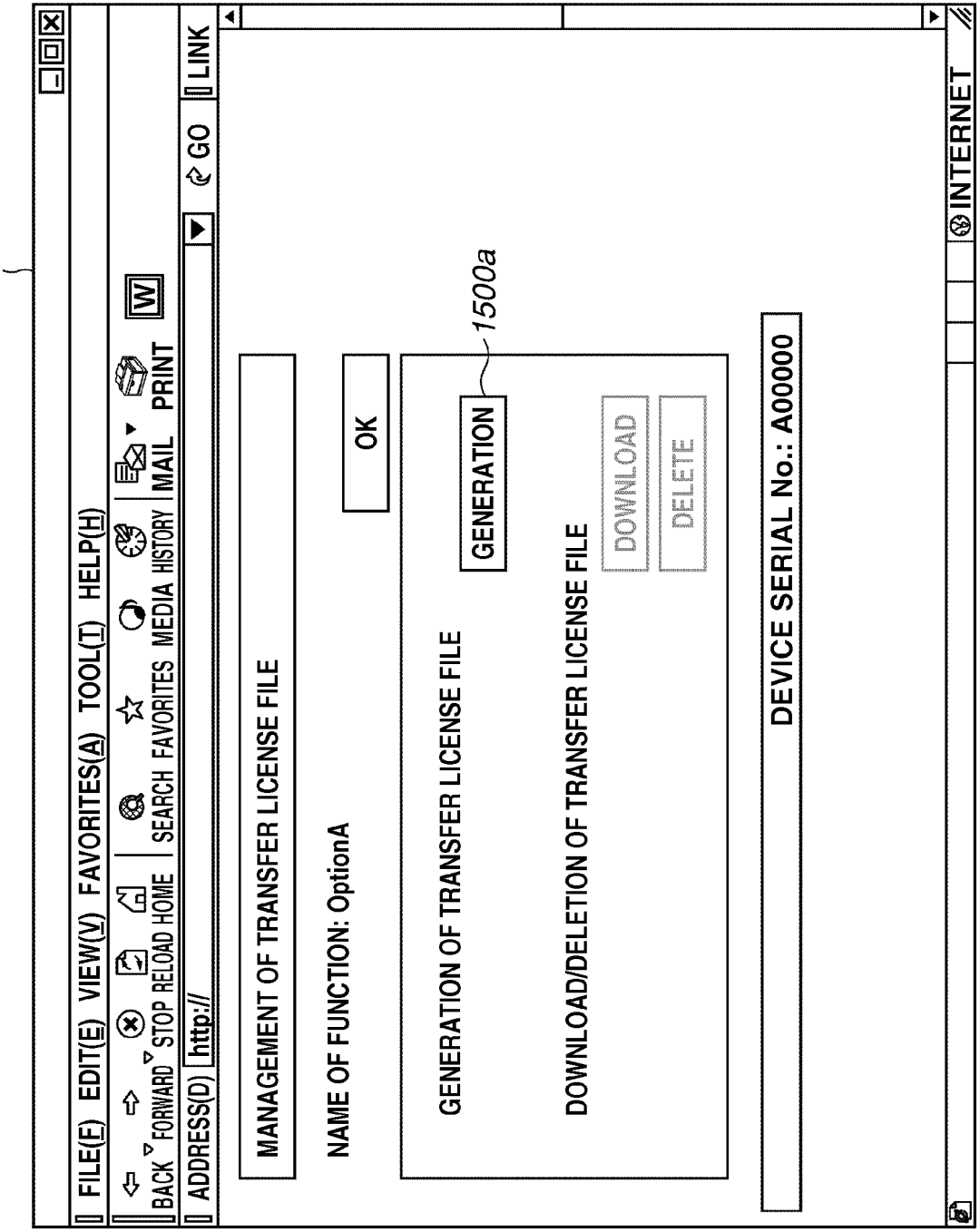
FIG. 15 illustrates an example transfer license file management screen according to the first exemplary embodiment of the present invention.
Figure 16:
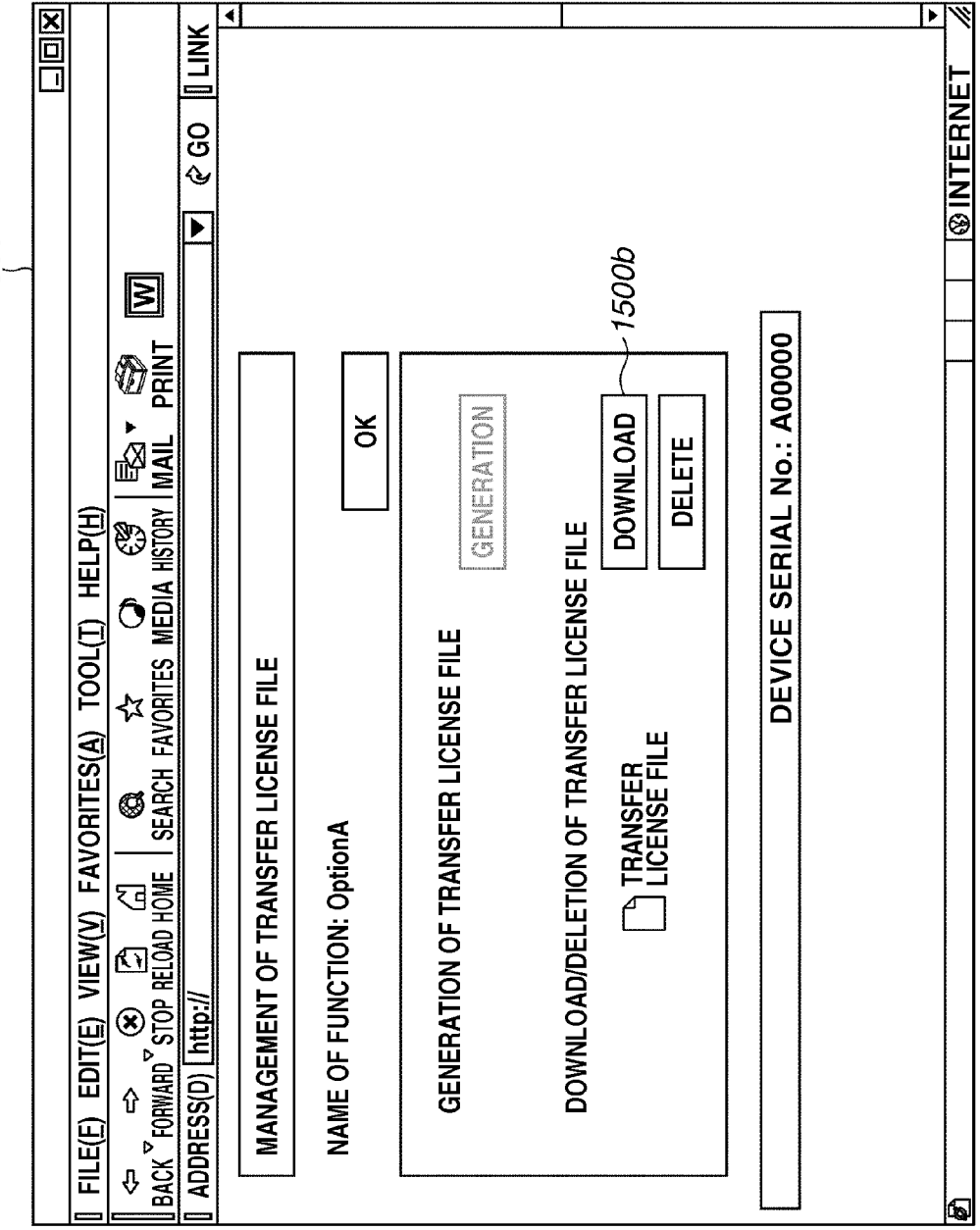
FIG. 16 illustrates an example transfer license file management screen displayed after generation of a transfer license according to the first exemplary embodiment of the present invention.

More specifically, if a user presses a generation button 1500a on the transfer license file management screen 1500 illustrated in FIG. 15, the MFP 103 generates a transfer license. Then, if the user presses a download button 1500b on the transfer license file management screen 1500 illustrated in FIG. 16, the MFP 103 downloads the transfer license. The PC 102 acquires the transfer license from the MFP 103. As described above, the PC 102 repeats accessing the MFP 103 via a browser until the PC 102 acquires transfer licenses for the five functions belonging to the same group of the integrated product A.

When the PC 102 acquires the transfer licenses in this manner, the MFP 103 becomes unable to use any one of the five functions belonging to the same group of the integrated product A. As described above, according to the above-described exemplary embodiment, the PC 102 realizes an execution disabling unit and a transmission unit configured to perform the processing of step S1301.

Next, in step S1302 of FIG. 13, the PC 102 sends a license transfer request to the license management server 101. The license transfer request includes device identification information DS (A00000) of the MFP 103 (transfer source) and device identification information DS (B00000) of the MFP 104 (transfer destination).

FIG. 18 illustrates an example device identification information input screen 1800 displayed by the PC 102 to enable a user to send a license transfer request to the license management server 101. The user inputs device identification information DS (A00000) of the MFP 103 (transfer source) and device identification information DS (B00000) of the MFP 104 (transfer destination) on the device identification information input screen 1800. The PC 102 sends a license transfer request including the information of the device identification information input screen 1800 to the license management server 101.

In step S1201 of FIG. 12, the license management server 101 accepts a license transfer request from the PC 102 under the control of the license management control unit 201 and the input/output control unit 203.

In step S1202, the license management server 101 acquires device identification information DS of the MFP 103 (transfer source) and device identification information DS of the MFP 104 (transfer destination) under the control of the license management control unit 201 and the input/output control unit 203.

In step S1203, the license management server 101 performs the following processing under the control of the license management control unit 201. More specifically, the license management server 101 identifies LA used when the license was issued for the MFP 103 (transfer source), based on the acquired device identification information DS of the MFP 103 (transfer source) and the license issuance management table 401.

In step S1204, the license management server 101 identifies a license transfer object product based on the identified LA, the LA issuance management table 301, the product management table 501, and the integrated product management table 601 under the control of the license management control unit 201. In this case, the license management server 101 determines whether the license transfer object product is an integrated product. Then, the license management server 101 waits for input of transfer licenses.

In step S1303 of FIG. 13, the PC 102 transmits all of transfer licenses acquired from the MFP 103 (transfer source) to the license management server 101. FIG. 19 illustrates an example transfer license designation screen 1900 displayed by the PC 102 when transfer licenses are to be transmitted to the license management server 101.

In step S1205 of FIG. 12, the license management server 101 acquires a transfer license from the PC 102 under the control of the input/output control unit 203. In step S1206, the license management server 101 analyzes the acquired transfer license under the control of the license management control unit 201 and determines whether the transfer license is a transfer license of the MFP 103 (transfer source).

If the license management server 101 determines that the acquired transfer license is not a transfer license of the MFP 103 (transfer source) (NO in step S1206), the processing returns to step S1205. The license management server 101 waits for input of transfer licenses. According to the above-described exemplary embodiment, the license management server 101 realizes an acquisition unit configured to perform the processing of steps S1205 and S1206.

If the acquired transfer license is a transfer license of the MFP 103 (transfer source) (YES in step S1206), the processing proceeds to step S1207.

In step S1207, the license management server 101 analyzes the acquired transfer license under the control of the license management control unit 201. Then, the license management server 101 identifies a function corresponding to the transfer license.

In step S1208, the license management server 101 identifies information of a group to which the function belongs (group identification ID) under the control of the license management control unit 201, based on a function ID that identifies the identified function and the integrated product management table 601. According to the above-described exemplary embodiment, the license management server 101 realizes an identification unit configured to perform the processing of step S1208.

Then, the license management server 101 performs the following processing under the control of the license management control unit 201. More specifically, in step S1209, the license management server 101 determines whether transfer licenses corresponding to all function IDs belonging to the same group are acquired, based on the identified group information and the integrated product management table 601.

If the license management server 101 determines that not all of the transfer licenses belonging to the same group are acquired (NO in step S1209), the processing proceeds to step S1210.

In step S1210, the license management server 101 does not perform license transfer processing. The license management server 101 waits for input of the next transfer license. Then, if the next transfer license is acquired, the license management server 101 analyzes the acquired transfer license under the control of the license management control unit 201.

Then, in step S1211, the license management server 101 determines whether the acquired transfer license is a transfer license of the MFP 103 (transfer source) under the control of the license management control unit 201.

If the license management server 101 determines that the acquired transfer license is not a transfer license of the MFP 103 (transfer source) (NO in step S1211), the processing returns to step S1210. The license management server 101 waits for input of the next transfer license. If the license management server 101 determines that the acquired transfer license is a transfer license of the MFP 103 (transfer source) (YES in step S1211), the processing returns to step S1209.

In step S1209, the license management server 101 determines whether transfer licenses corresponding to all function IDs belonging to the same group are acquired.

If the license management server 101 determines that transfer licenses corresponding to all function IDs belonging to the same group are acquired (YES in step S1209), the processing proceeds to step S1212.

In step S1212, the license management server 101 issues licenses usable in the MFP 104 (transfer destination) to the PC 102, by an amount corresponding to the number of functions belonging to the same group in the integrated product A, under the control of the license management control unit 201 and the license issuance control unit 202.

According to the above-described exemplary embodiment, the license management server 101 realizes a transfer unit configured to perform the processing of step S1212. Next, the license management server 101 performs the following processing under the control of the license management control unit 201 and the license issuance control unit 202.

More specifically, in step S1213, the license management server 101 registers the device-specific information DS of the MFP 104 (transfer destination) into a "device-specific information DS" field corresponding to the identified LA on the license issuance management table 401. Furthermore, the license management server 101 registers the issued license into the "issued license" field of the license issuance management table 401 under the control of the license management control unit 201 and the license issuance control unit 202.

In step S1304 of FIG. 13, the PC 102 acquires licenses for the functions belonging to the same group of the integrated product A from the license management server 101. The acquired licenses can be used to enable the functions of the integrated product A in the MFP 104 (transfer destination).

FIG. 20 illustrates an example license acquisition screen 2000 displayed by the PC 102, which enables a user to acquire a license to be transferred to the MFP 104 (transfer destination).

In step S1305, the PC 102 accesses the MFP 104 via a browser and installs all of the acquired licenses on the MFP 104 (transfer destination). Thus, the MFP 104 is enabled to perform the functions corresponding to the installed licenses.

Figure 17:
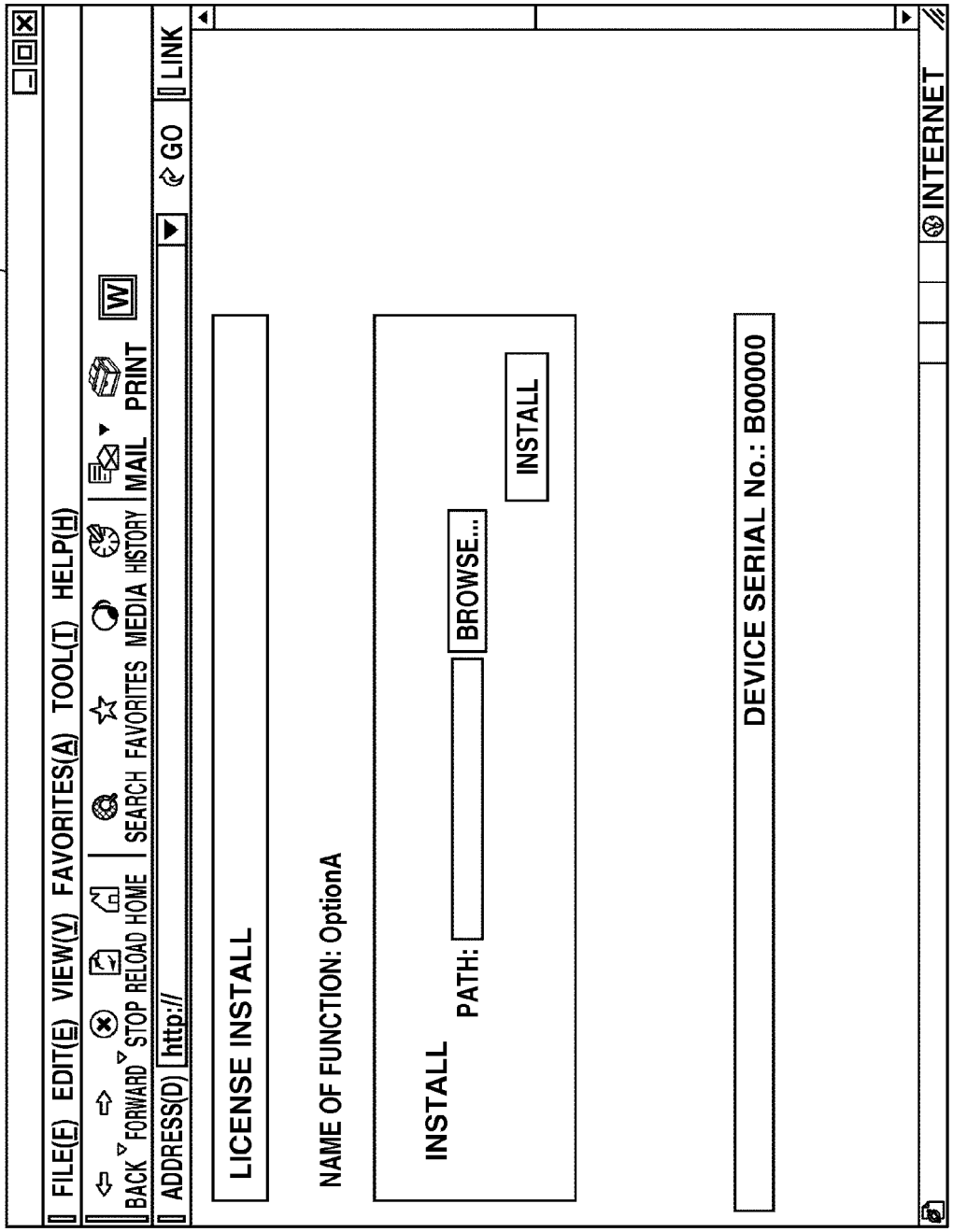
FIG. 17 illustrates an example license transfer screen according to the first exemplary embodiment of the present invention.

FIG. 17 illustrates an example license transfer screen 1700 displayed by the PC 102 to enable a user to install (transfer) a license on the MFP 104 (transfer destination). According to the above-described exemplary embodiment, the PC 102 realizes a reception unit and an execution enabling unit configured to perform the processing of step S1304.

As described above, an exemplary embodiment sets at least one group for a plurality of functions included in an integrated product. The license management server 101 waits for completion of acquiring licenses for all functions belonging to the same group of an integrated product installed on the MFP 103 (transfer source).

Then, after acquiring the licenses for all functions belonging to the same group of an integrated product installed on the MFP 103 (transfer source), the license management server 101 permits installing the licenses of the acquired functions on the MFP 104 (transfer destination).

Accordingly, all of the licenses belonging to the same group of the integrated product A are batch-transferred from the MFP 103 (transfer source) to the MFP 104 (transfer destination). The MFP 104 is thus enabled to perform the functions belonging to the same group of the integrated product A. Accordingly, an exemplary embodiment can prevent a plurality of functions included in an integrated product from being separately transferred.

The above-described exemplary embodiment uses the PC 102 to perform license transfer processing. However, according to another exemplary embodiment, a user of a device (MFP) can operate the operation unit 1013 to directly request the license management server 101 to transfer licenses without using the PC 102 and perform batch transfer of licenses belonging to the same group of an integrated product.

Second Exemplary Embodiment

A second exemplary embodiment of the present invention will be described below. According to the above-described first exemplary embodiment, the MFP 103 (transfer source) and the MFP 104 (transfer destination) support the same "license requiring function."

The MFP 103 (transfer source) and the MFP 104 (transfer destination) according to the second exemplary embodiment do not support the same "license requiring function." Accordingly, in the following description, portions similar to those described in the above-described first exemplary embodiment are denoted by the same reference numerals used in FIGS. 1 through 20.

The license management server 101 stores the range of the device-specific information DS allocated to respective machine models of the MFPs 103 and 105 into the machine model management table 701 (see FIG. 7) of the device information storage unit 209 under the control of the device information management unit 208.

Furthermore, the license management server 101 registers information indicating whether respective machine models of the MFPs 103 to 105 correspond to respective functions managed by licenses and stores the information in the support information management table 801 (see FIG. 8) under the control of the device information management unit 208.

In an exemplary embodiment, the MFP 103 is a machine model X, the MFP 104 is a machine model Y, and the MFP 105 is a machine model Z. The following is example processing for transferring licenses of the integrated product A from the MFP 103 to the MFP 104. An exemplary embodiment can realize a second management unit configured to use the support information management table 801 illustrated in FIG. 8.

First, the PC 102 requests the MFP 103 to output four transfer licenses other than the function (Option B), which is not supported by the MFP 103 (machine model X), from among five functions included in the same group of the integrated product A.

The MFP 103 generates and issues four transfer licenses corresponding to the request from the PC 102. After issuance of the four transfer licenses, the MFP 103 is no longer able to use the functions corresponding to the issued four transfer licenses. Next, the PC 102 sends a license transfer request to the license management server 101 based on the device identification information DS of the MFP 103 (transfer source) and the device identification information DS of the MFP 104 (transfer destination).

FIG. 21 is a flowchart illustrating an example operation of the license management server 101, which performs license transfer processing. In step S2101, the license management server 101 accepts a license transfer request from the PC 102 under the control of the license management control unit 201 and the input/output control unit 203. In step S2102, the license management server 101 acquires the device identification information DS of the MFP 103 (transfer source) and the device identification information DS of the MFP 104 (transfer destination) under the control of the license management control unit 201 and the input/output control unit 203.

In step S2103, the license management server 101 identifies a machine model (machine model Y) of the MFP 104 (transfer destination) based on the acquired device identification information DS of the MFP 104 (transfer destination) and the machine model management table 701 under the control of the license management control unit 201.

Next, the license management server 101 performs the following processing based on the acquired device identification information DS of the MFP 103 (transfer source), the license issuance management table 401, and the machine model management table 701 under the control of the license management control unit 201.

More specifically, in step S2104, the license management server 101 identifies the LA used when a license was issued for the MFP 103 (transfer source) and a machine model (machine model X) of the MFP 103 (transfer source).

In step S2105, the license management server 101 identifies a license transfer object product based on the identified LA, the LA issuance management table 301, the product management table 501, and the integrated product management table 601 under the control of the license management control unit 201. Furthermore, the license management server 101 determines whether the license transfer object product is an integrated product. Then, the license management server 101 waits for input of transfer licenses.

The PC 102 transmits all of the transfer licenses acquired from the MFP 103 (transfer source) to the license management server 101. In step S2106, the license management server 101 acquires transfer licenses from the PC 102 under the control of the input/output control unit 203. In step S2107, the license management server 101 analyzes the acquired transfer licenses under the control of the license management control unit 201 and identifies functions corresponding to the transfer licenses.

In step S2108, the license management server 101 identifies information of a group to which the function belongs (group identification ID) under the control of the license management control unit 201, based on a function ID that identifies the identified function and the integrated product management table 601. The license management server 101 performs the following processing under the control of the license management control unit 201.

More specifically, in step S2109, the license management server 101 determines whether transfer licenses corresponding to all functions belonging to the identified group and supported by the transfer source (machine model X) are acquired, based on the support information management table 801.

According to the example illustrated in FIG. 8, the license management server 101 determines whether transfer licenses corresponding to four functions supported by the machine model X (other than the function corresponding to the function ID "Option B") are acquired from the PC 102. According to the above-described exemplary embodiment, the license management server 101 realizes a first determination unit configured to perform the processing of step S2109.

If the license management server 101 determines that acquiring all of the required transfer licenses is not completed (NO in step S2109), the processing proceeds to step S2110. In step S2110, the license management server 101 does not perform license transfer processing. The license management server 101 waits for input of the next transfer license.

If the license management server 101 determines that acquiring all of the transfer licenses corresponding to the functions belonging to the identified group and supported by the transfer source (machine model X) is completed (YES in step S2109), the processing proceeds to step S2111.

Then, the license management server 101 performs the following processing under the control of the license management control unit 201 and the license issuance control unit 202. More specifically, in step S2111, the license management server 101 issues, to the PC 102, all of transfer licenses for the functions belonging to the identified group and supported by the MFP 104 (transfer destination) (machine model Y) with reference to the support information management table 801.

According to the example illustrated in FIG. 8, the license management server 101 issues four licenses for the functions other than the function corresponding to the function ID of Option C to the PC 102. According to the above-described exemplary embodiment, the license management server 101 realizes a second determination unit and a transfer unit configured to perform the processing of step S2111.

Next, the license management server 101 performs the following processing under the control of the license management control unit 201 and the license issuance control unit 202. More specifically, in step S2112, the license management server 101 registers the device-specific information DS of the MFP 104 (transfer destination) into the "device-specific information DS" field corresponding to the identified LA on the license issuance management table 401. Furthermore, the license management server 101 registers the issued license into the "issued license" field of the license issuance management table 401 under the control of the license management control unit 201 and the license issuance control unit 202.

The PC 102 acquires, from the license management server 101, licenses for the functions belonging to the same group of the integrated product A and supported by the MFP 104 (transfer destination) to enable the functions of the integrated product A in the MFP 104 (transfer destination). According to the example illustrated in FIG. 8, the PC 102 acquires four licenses for the functions other than the function corresponding to the function ID of Option C. Then, the PC 102 installs all of the acquired licenses on the MFP 104. Thus, the MFP 104 starts processing for enabling the functions corresponding to all of the acquired licenses.

As described above, the license management server 101 according to an exemplary embodiment waits for completion of acquiring all of the transfer licenses for the functions belonging to the same group of an integrated product installed on the MFP 103 (transfer source) and supported by the MFP 103 (transfer source). After acquiring the transfer licenses, the license management server 101 allows installing licenses for the functions supported by the MFP 104 (transfer destination) on the MFP 104, of all the licenses for the functions belonging to the same group of the integrated product installed on the MFP 103 (transfer source).

Accordingly, licenses belonging to the same group of the integrated product A are batch-transferred from the MFP 103 (transfer source) to the MFP 104 (transfer destination) even if the functions in the integrated product A include functions usable only in a license transfer source and functions usable only in a license transfer destination. Accordingly, a user of the MFP 104 can use functions belonging to the same group of the integrated product A. Similar to the first exemplary embodiment, an exemplary embodiment can prevent a plurality of functions included in an integrated product from being separately transferred.

Other Exemplary Embodiments

A license management apparatus, functional units constituting a license management system, and steps of a license management method according to the above-described exemplary embodiments of the present invention can be realized by a computer that executes software program(s) stored in a RAM or a ROM. In this respect, the present invention includes program(s) and a computer-readable storage medium that can store the program(s).

The present invention can be embodied as a system, an apparatus, a method, a program, or a storage medium. More specifically, the present invention can be applied to a system including a plurality of devices or can be applied to a single apparatus.

Software program code for realizing the functions of the above-described exemplary embodiments (program code corresponding to the flowcharts illustrated in FIGS. 12, 13, and 21) can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they realize comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying a program includes accessing a web site on the Internet using a browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. Authorized users (i.e., users satisfying predetermined conditions) are allowed to download key information from a page on the Internet. The users can decipher the programs with the obtained key information and can install the programs on their computers. When the computer executes the installed programs, the functions of the above-described exemplary embodiments can be realized.

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

An exemplary embodiment of the present invention can prevent licenses of a plurality of functions included in a program package (an integrated product) from being separately transferred to other devices.

An exemplary embodiment of the present invention manages the whole or part of a plurality of functions included in a program package (an integrated product) as one group.

An exemplary embodiment acquires license information of a plurality of functions belonging to the same group from a transfer source device and transfers the license information of the plurality of functions belonging to the same group to a transfer destination device. Accordingly, an exemplary embodiment can prevent functions included in a program package from being separately transferred.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-192269 filed Jul. 24, 2007, which is hereby incorporated by reference herein in its entirety.

What is claimed is:

1. A license management system including a license management apparatus, a transfer source device, and a transfer destination device, the license management apparatus having a processor, which is configured to transfer license information used for enabling a plurality of functions included in a program package into which a plurality of programs is packaged from the transfer source device to the transfer destination device, wherein the license management apparatus comprises:
a management unit configured to manage parts of the plurality of functions included in the program package as belonging to one group, wherein each of the plurality of functions corresponds to a different one of programs included in the program package;
an acquisition unit configured to acquire license information, using the processor, of functions installed on the transfer source device;
a determination unit configured to determine whether license information corresponding to all of functions supported by the transfer source device, among license information of functions managed as belonging to a same group, has been acquired; and
a transfer unit configured to transfer, after license information of functions included in the program package and managed by the management unit as belonging to the same group is acquired from the transfer source device by the acquisition unit, license information of the functions managed as belonging to the same group to the transfer destination device,
wherein the transfer source device comprises an execution disabling unit configured to disable execution of functions installed on the transfer source device, and a transmission unit configured to transmit license information of the functions installed on the transfer source device,
wherein the transfer destination device comprises a reception unit configured to receive license information, an execution enabling unit configured to enable execution of functions corresponding to the license information received by the reception unit, and a performing unit configured to perform the functions corresponding to the transferred license information, and
wherein, even if the acquisition unit acquires license information of only parts of the functions managed as belonging to the same group from the transfer source device, but if the determination unit determines that the license information corresponding to all of the functions supported by the transfer source device has been acquired, the transfer unit transfers the license information of the functions managed as belonging to the same group to the transfer destination device, the transferred license information including license information which has not been acquired from the transfer source device.

2. The license management system according to claim 1, wherein after the license information of functions included in the program package and managed by the management unit as belonging to the same group and executable by the transfer source device is acquired from the transfer source device, the transfer unit transfers the license information of functions managed as belonging to the same group and executable by the transfer destination device to the transfer destination device.

3. A license management system comprising:
a license management apparatus;
a transfer source device; and
a transfer destination device,
wherein the license management apparatus is configured to transfer license information used for enabling a plurality of functions included in a program package into which a plurality of programs is packaged from the transfer source device to the transfer destination device, the license management apparatus comprising:
a management unit configured to manage parts of the plurality of functions included in the program package as belonging to one group, wherein each of the plurality of functions corresponds to a different one of programs included in the program package;
an acquisition unit configured to acquire license information of functions installed on the transfer source device;
a determination unit configured to determine whether license information corresponding to all of functions supported by the transfer source device, among license information of functions managed as belonging to a same group, has been acquired; and
a transfer unit configured to transfer, after license information of functions included in the program package and managed by the management unit as belonging to the same group is acquired from the transfer source device by the acquisition unit, license information of the functions managed as belonging to the same group to the transfer destination device; and wherein the transfer source device comprises:
an execution disabling unit configured to disable execution of functions installed on the transfer source device; and
a transmission unit configured to transmit license information of the functions installed on the transfer source device, wherein the transfer destination device comprises:
a reception unit configured to receive license information; and
an execution enabling unit configured to enable execution of functions corresponding to the license information received by the reception unit; and
a performing unit configured to perform the functions corresponding to the transferred license information, wherein, even if the acquisition unit acquires license information of only parts of the functions managed as belonging to the same group from the transfer source device, but if the determination unit determines that the license information corresponding to all of the functions supported by the transfer source device has been acquired, the transfer unit transfers the license information of the functions managed as belonging to the same group to the transfer destination device, the transferred license information including license information which has not been acquired from the transfer source device.

4. A license management method for a license management system including a license management apparatus, a transfer source device, and a transfer destination device, the license management apparatus having a processor, which is configured to transfer license information used for enabling a plurality of functions included in a program package into which a plurality of programs is packaged from the transfer source device to the transfer destination device, the license management method comprising:

managing parts of the plurality of functions included in the program package as belonging to one group, wherein each of the plurality of functions corresponds to a different one of programs included in the program package;
acquiring license information, using the processor, of functions installed on the transfer source device;
determining whether license information corresponding to all of functions supported by the transfer source device, among license information of functions managed as belonging to a same group, has been acquired;
after license information of functions included in the program package and managed as belonging to the same group is acquired from the transfer source device, transferring license information of the functions managed as belonging to the same group to the transfer destination device;
disabling execution of functions installed on the transfer source device, and transmitting license information of the functions installed on the transfer source device,
receiving license information, enabling execution of functions corresponding to the received license information, and performing, by the transfer destination device, the functions corresponding to the transferred license information; and
transferring, even if the acquiring acquires license information of only parts of the functions managed as belonging to the same group from the transfer source device, but if the determining determines that the license information corresponding to all of the functions supported by the transfer source device has been acquired, the license information of the functions managed as belonging to the same group to the transfer destination device, the transferred license information including license information which has not been acquired from the transfer source device.

5. The license management method according to claim 4, further comprising, after the license information of functions included in the program package and managed as belonging to the same group and executable by the transfer source device is acquired from the transfer source device, transferring the license information of functions managed as belonging to the same group and executable by the transfer destination device to the transfer destination device.

* * * * *